United States Patent
Kornaropoulos et al.

(10) Patent No.: US 9,942,032 B1
(45) Date of Patent: Apr. 10, 2018

(54) SYSTEMS AND METHODS FOR SECURELY DETECTING DATA SIMILARITIES

(71) Applicant: Symantec Corporation, Mountain View, CA (US)

(72) Inventors: Evgenios Kornaropoulos, Providence, RI (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 26 days.

(21) Appl. No.: 14/871,868

(22) Filed: Sep. 30, 2015

(51) Int. Cl.
*H04L 9/32* (2006.01)
*H04L 9/00* (2006.01)
*G06F 21/60* (2013.01)
*G06F 17/22* (2006.01)

(52) U.S. Cl.
CPC .............. *H04L 9/008* (2013.01); *G06F 21/60* (2013.01); *H04L 9/3236* (2013.01); *G06F 17/2211* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 7,702,683 B1* | 4/2010 | Kirshenbaum ... | G06F 17/30109 707/718 |
| 8,140,505 B1* | 3/2012 | Jain ................... | G06F 17/30949 707/706 |
| 9,311,403 B1* | 4/2016 | Ioffe ................. | G06F 17/30247 |
| 9,760,548 B2* | 9/2017 | Cooke ................ | G06F 17/2211 |
| 2011/0035805 A1* | 2/2011 | Barkan .............. | G06F 21/10 726/26 |
| 2011/0173177 A1* | 7/2011 | Junqueira ......... | G06F 17/30864 707/709 |

(Continued)

OTHER PUBLICATIONS

Buyrukbilen et al.; Secure Similar Document Detection with Simhash; 2014; Retrieved from the Internet <URL: http://link.springer.com/chapter/10.1007/978-3-319-06811-4_12>; pp. 1-15 as printed.*

(Continued)

*Primary Examiner* — Saleh Najjar
*Assistant Examiner* — Michael W Chao
(74) *Attorney, Agent, or Firm* — FisherBroyles, LLP

(57) ABSTRACT

A computer-implemented method for securely detecting data similarities may include (1) identifying a private data object subject to comparison to determine a similarity with at least one potentially similar data object, (2) establishing a connection between a client system and a server that is not authorized to access the private data object, (3) generating a summary of the private data object by applying a summary generation protocol between the client system and the server to the private data object without exposing plaintext from the private data object to the server and without exposing a parameter of the summary generation protocol to the client system, and (4) computing the similarity between the private data object and the potentially similar data object by using the summary of the private data object and a summary of the potentially similar data object. Various other methods, systems, and computer-readable media are also disclosed.

20 Claims, 7 Drawing Sheets

(56) References Cited

U.S. PATENT DOCUMENTS

2011/0235908 A1* 9/2011 Ke .................. G06K 9/4642
382/173
2014/0355756 A1* 12/2014 Iwamura .............. H04L 9/008
380/30

OTHER PUBLICATIONS

Kerschbaum, Florian; Outsourced PRivate Set Intersection Using Homomorphic Encryption; 2012; Retrieved from the Internet <URL: http://dl.acm.org/citation.cfm?id=2414506>; pp. 1-10 as printed.*

Veugen, Thijs, "Comparing Encrypted Data", (2010).

Mitzenmacher, Michael et al., "Efficient Estimation for High Similarities using Odd Sketches", In Proceedings of the 23rd International Conference on World Wide Web, WWW'14, Seoul, Korea, (Apr. 7-11, 2014), pp. 109-118.

Blundo, Carlo et al., "EsPRESSo: Efficient Privacy-Preserving Evaluation of Sample Set Similarity", http://link.springer.com/chapter/10.1007%2F978-3-642-35890-6_7, as accessed Aug. 31, 2015, Data Privacy Management and Autonomous Spontaneous Security, Lecture Notes in Computer Science, vol. 7731, (2013), pp. 89-103.

Buyrukbilen, Sahin et al., "Secure Similar Document Detection with Simhash", http://link.springer.com/chapter/10.1007%2F978-3-319-06811-4_12, as accessed Aug. 31, 2015, Secure Data Management, Lecture Notes in Computer Science, vol. 8425, Proceedings of the 10th VLDB Workshop, SDM 2013, Trento, Italy, (Aug. 30, 2013), pp. 61-75.

Bost, Raphael et al., "Machine Learning Classification over Encrypted Data", https://eprint.iacr.org/2014/331.pdf, as accessed Aug. 31, 2015, Cryptology ePrint Archive, Report 2014/331, (2014).

Broder, Andrei Z., et al., "Min-Wise Independent Permutations", Journal of Computer and System Sciences, vol. 60, Issue 3, (Jun. 2000), pp. 630-659.

Carter, J. L., et al., "Universal Classes of Hash Functions", Journal of Computer and System Sciences, vol. 18, Issue 2, (Apr. 1979), pp. 143-154.

Charikar, Moses S., et al., "Similarity Estimation Techniques from Rounding Algorithms", STOC'02, Proceedings of the Thirty-Fourth Annual ACM Symposium on Theory of Computing, Montreal, Quebec, Canada, (May 19-21, 2002).

Goldwasser, Shafi et al., "Probabilistic Encryption", Journal of Computer and System Sciences, vol. 28, Issue 2, (Apr. 1984), pp. 270-299.

Henzinger, Monika, "Finding Near-Duplicate Web Pages: A Large-Scale Evaluation of Algorithms", Proceedings of the 29th Annual International ACM SIGIR Conference on Research and Development in Information Retrieval, SIGIR'06, Seattle, Washington, USA, (Aug. 6-11, 2006), pp. 284-291

Jiang, Wei et al., "N-Gram Based Secure Similar Document Detection", http://link.springer.com/chapter/10.1007%2F978-3-642-22348-8_19, as accessed Aug. 31, 2015, Proceedings of the 25th Annual IFIP WG 11.3 Conference, DBSec 2011, Data and Applications Security and Privacy XXV, Lecture Notes in Computer Science, vol. 6818, Richmond, VA, USA, (Jul. 11-13, 2011), pp. 239-246.

Mamku, Gurmeet S., "Detecting Near-Duplicates for Web Crawling", Proceedings of the 16th International Conference on World Wide Web, WWW '07, Banff, Alberta, Canada, (May 8-12, 2007), pp. 141-149.

Paillier, Pascal, "Public-Key Cryptosystems Based on Composite Degree Residuosity Classes", Proceedings of the 17th International Conference on Theory and Application of Cryptographic Techniques, EUROCRYPT'99, LNCS 1592, Prague, Czech Republic, (May 2-6, 1999), pp. 223-238.

Veugen, Thijs, "Encrypted integer division and secure comparison", International Journal of Applied Cryptography, vol. 3, Issue 2, (Jun. 2014), pp. 166-180.

* cited by examiner

SYSTEMS AND METHODS FOR SECURELY DETECTING DATA SIMILARITIES

BACKGROUND

In the digital age, individuals and organizations increasingly rely on digitally-stored data used for a variety of applications. For some purposes, a party may have cause to compare data owned by the party with data owned by another party, or to submit to such a comparison. For example, two parties may have cause to determine whether a data object owned by one party is similar to a data object owned by the other party. However, one or both parties may also have cause to maintain data privacy—not only from each other, but from all outside parties.

Previous attempts to simultaneously address the need to compare private data with the need to maintain data privacy have fallen short. For example, previously proposed similarity detection approaches that compute an exact similarity between two data objects may require computing resources that scale linearly with the size of the data objects. However, previously proposed approximate similarity detection procedures may allow a party that has submitted to such a procedure to leverage the approximation involve to manipulate submitted data in such a way as to preserve similarity while evading a detection of similarity by the procedure.

Accordingly, the instant disclosure identifies and addresses a need for additional and improved systems and methods for securely detecting data similarities.

SUMMARY

As will be described in greater detail below, the instant disclosure generally relates to systems and methods for securely detecting data similarities by maintaining one or more parameters used in a similarity detection procedure secret (e.g., on a system out of the control of a party submitting data for the similarity detection procedure) and employing one or more partially homomorphic cryptographic schemes to allow a system that controls the secret parameters to manipulate private data into a similarity determination for the private data without accessing the private data in plaintext form.

In one example, a computer-implemented method for securely detecting data similarities may include (1) identifying a private data object that is subject to a similarity detection system whereby the private data object is subject to comparison with at least one potentially similar data object to determine a similarity between the private data object and the potentially similar data object, (2) establishing a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key, (3) generating a summary of the private data object by applying a summary generation protocol between the client system and the server to the private data object without exposing plaintext from the private data object to the server and without exposing a parameter of the summary generation protocol to the client system, where the summary of the private data object includes intermediate data toward applying a similarity metric to the private data object, and (4) computing the similarity, according to the similarity metric, between the private data object and the potentially similar data object by using the summary of the private data object and a summary of the potentially similar data object as input.

In some examples, the computer-implemented method may further include reusing the summary of the private data object to compute a similarity, according to the similarity metric, between the private data object and an additional potentially similar data object by using the summary of the private data object and a summary of the additional potentially similar data object as input.

In one embodiment, the summary of the potentially similar data object may have been generated without exposing plaintext from the potentially similar data object to the server and without exposing a parameter of the summary generation protocol used by the server to an additional client system authorized to access the potentially similar data object in plaintext form.

In some examples, applying the summary generation protocol to the private data object may include performing, at the server, a homomorphic operation within the partially homomorphic encryption scheme on input data that is derived from the private data object and that is in ciphertext form.

In some examples, applying the summary generation protocol to the private data object may include providing, from the client to the server, input data that is derived from the private data object and that is in ciphertext form and receiving, at the client from the server, a result of the server performing a computation including a homomorphic operation within the partially homomorphic encryption scheme on the input data.

In one embodiment, (1) the private data object may include a data set, (2) generating the summary of the private data object may include identifying a group of minimum hash values for the data set that correspond to a group of parameterized hash functions without, for each minimum hash value in the minimum hash values, exposing hash values of the data set and/or a relative order of hash values for the data set to the client system and without exposing to the server which element of the data set in ciphertext form corresponds to the minimum hash value, and (3) the parameter of the summary generation protocol may include a parameter of at least one of the parameterized hash functions.

In one embodiment, identifying the minimum hash values for the data set may include performing a group of comparisons between a group of candidate minimum hash values and performing the comparisons may include providing, for each comparison in the comparisons, a result of the comparison to the client system without exposing to the client system to which elements within the data set the result of the comparison pertains.

In one embodiment, the private data object may include a vector and generating the summary of the private data object may include generating the summary without exposing a random projection applied to the vector to the client system.

In some examples, generating the summary may include generating the summary based on computations performed by the server and based on computations performed by the computing system.

In some examples, the computer-implemented method may further include applying a data loss prevention policy to the private data object based on the similarity.

In one embodiment, a system for implementing the above-described method may include (1) an identification module, stored in memory, that identifies a private data object that is subject to a similarity detection system whereby the private data object is subject to comparison with at least one potentially similar data object to determine a similarity between the private data object and the potentially similar data object, (2) a connection module, stored in memory, that establishes a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key, (3) a generation module, stored in memory, that generates a summary of the private data object by applying a summary generation protocol between the client system and the server to the private data object without exposing plaintext (or, e.g., information about the plaintext) from the private data object to the server and without exposing a parameter of the summary generation protocol to the client system, where the summary of the private data object may include intermediate data toward applying a similarity metric to the private data object, (4) a computation module, stored in memory, that computes the similarity, according to the similarity metric, between the private data object and the potentially similar data object by using the summary of the private data object and a summary of the potentially similar data object as input, and (5) at least one physical processor configured to execute the identification module, the connection module, the generation module, and the computation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a private data object that is subject to a similarity detection system whereby the private data object is subject to comparison with at least one potentially similar data object to determine a similarity between the private data object and the potentially similar data object, (2) establish a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key, (3) generate a summary of the private data object by applying a summary generation protocol between the client system and the server to the private data object without exposing plaintext (or, e.g., information about the plaintext) from the private data object to the server and without exposing a parameter of the summary generation protocol to the client system, where the summary of the private data object includes intermediate data toward applying a similarity metric to the private data object, and (4) compute the similarity, according to the similarity metric, between the private data object and the potentially similar data object by using the summary of the private data object and a summary of the potentially similar data object as input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
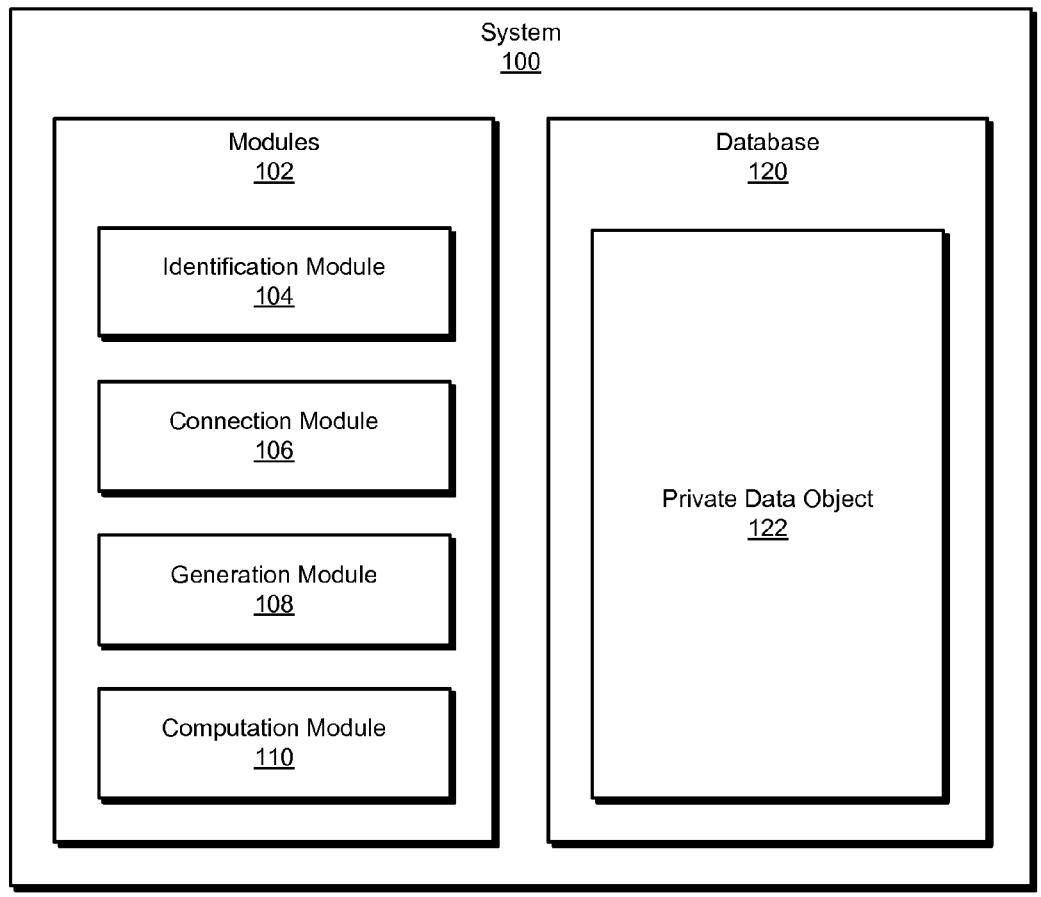
FIG. 1 is a block diagram of an exemplary system for securely detecting data similarities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securely detecting data similarities. As will be explained in greater detail below, by maintaining one or more parameters used in a similarity detection procedure secret (e.g., on a system out of the control of a party submitting data for the similarity detection procedure) and employing one or more partially homomorphic cryptographic schemes to allow a system that controls the secret parameters to manipulate private data into a similarity determination for the private data without accessing the private data in plaintext form, the systems and methods described herein may facilitate the detection of similar data objects (e.g., that are protected by encryption) while both maintaining the privacy of the data objects and preventing evasion of the detection. In addition, by using partially homomorphic cryptographic schemes, these systems and methods may make similarity determinations efficiently (e.g., as opposed to the computational burden imposed by using fully homomorphic cryptographic schemes). Furthermore, by using approximation techniques and by creating secure, reusable intermediate data structures in the process of making approximate similarity determinations, these systems and methods may further conserve computing resources.

The following will provide, with reference to FIGS. 1-2 and 4-5, detailed descriptions of exemplary systems for securely detecting data similarities. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for securely detecting data similarities. As illustrated in this figure, exemplary system 100 may include one or more modules 102 for performing one or more tasks. For example, and as will be explained in greater detail below, exemplary system 100 may include an identification module 104 that identifies a private data object that is subject to a similarity detection system whereby the private data object is subject to comparison with at least one potentially similar data object to determine a similarity between the private data object and the potentially similar data object. Exemplary system 100 may additionally include a connection module 106 that establishes a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key. Exemplary system 100 may also include a generation module 108 that generates a summary of the private data object by applying a summary generation protocol between the client system and the server to the private data object without exposing plaintext (or, e.g., information about the plaintext) from the private data object to the server and without exposing a parameter of the summary generation protocol to the client system, where the summary of the private data object may include intermediate data toward applying a similarity metric to the private data object. Exemplary system 100 may additionally include a computation module 110 that computes the similarity, according to the similarity metric, between the private data object and the potentially similar data object by using the summary of the private data object and a summary of the potentially similar data object as input. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client system 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a private data object 122 (e.g., a data object that may include private data and that therefore may be encrypted to prevent access to the private data).

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
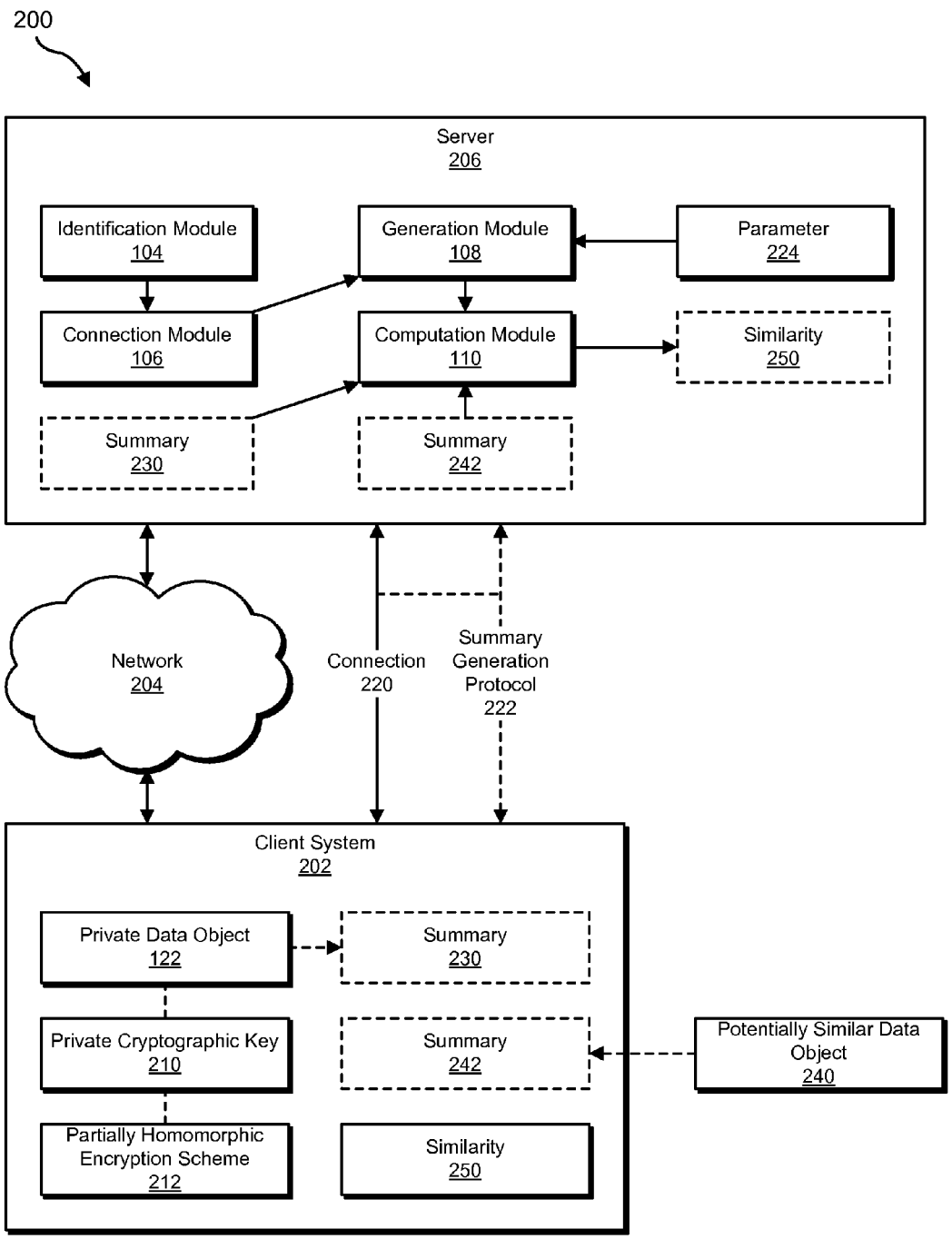
FIG. 2 is a block diagram of an additional exemplary system for securely detecting data similarities.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client system 202 in communication with a server 206 via a network 204. In one example, client system 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of client system 202 and/or server 206, enable client system 202 and/or server 206 to securely detect data similarities. For example, and as will be described in greater detail below, one or more of modules 102 may cause client system 202 and/or server 206 to securely detect data similarities between a data object private to client system 202 (e.g., private data object 122) and one or more additional data objects (e.g., potentially similar data object 240). For example, and as will be described in greater detail below, identification module 104 may identify private data object 122 that is subject to a similarity detection system whereby private data object 122 is subject to comparison with at least one potentially similar data object 240 to determine a similarity 250 between private data object 122 and potentially similar data object 240. Connection module 106 may establish a connection 220 between client system 202 that is authorized to access private data object 122 in plaintext form and that therefore has access to a private cryptographic key 210 used to decrypt private data object 122 according to a partially homomorphic encryption scheme 212 and server 206 that is not authorized to access private data object 122 in plaintext form and that therefore lacks access to private cryptographic key 210. Generation module 108 may generate a summary 230 of private data object 122 by applying a summary generation protocol 222 between client system 202 and server 206 to private data object 122 without exposing plaintext (or, e.g., information about the plaintext) from private data object 122 to server 206 and without exposing a parameter 224 of summary generation protocol 222 to client system 202, where the summary of private data object 122 may include intermediate data toward applying a similarity metric to private data object 122. Computation module 110 may compute similarity 250, according to the similarity metric, between private data object 122 and potentially similar data object 240 by using summary 230 of private data object 122 and a summary 242 of potentially similar data object 240 as input.

Client system 202 generally represents any type or form of computing device capable of reading computer-executable instructions. Examples of client system 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client system 202 and server 206.

Figure 3:
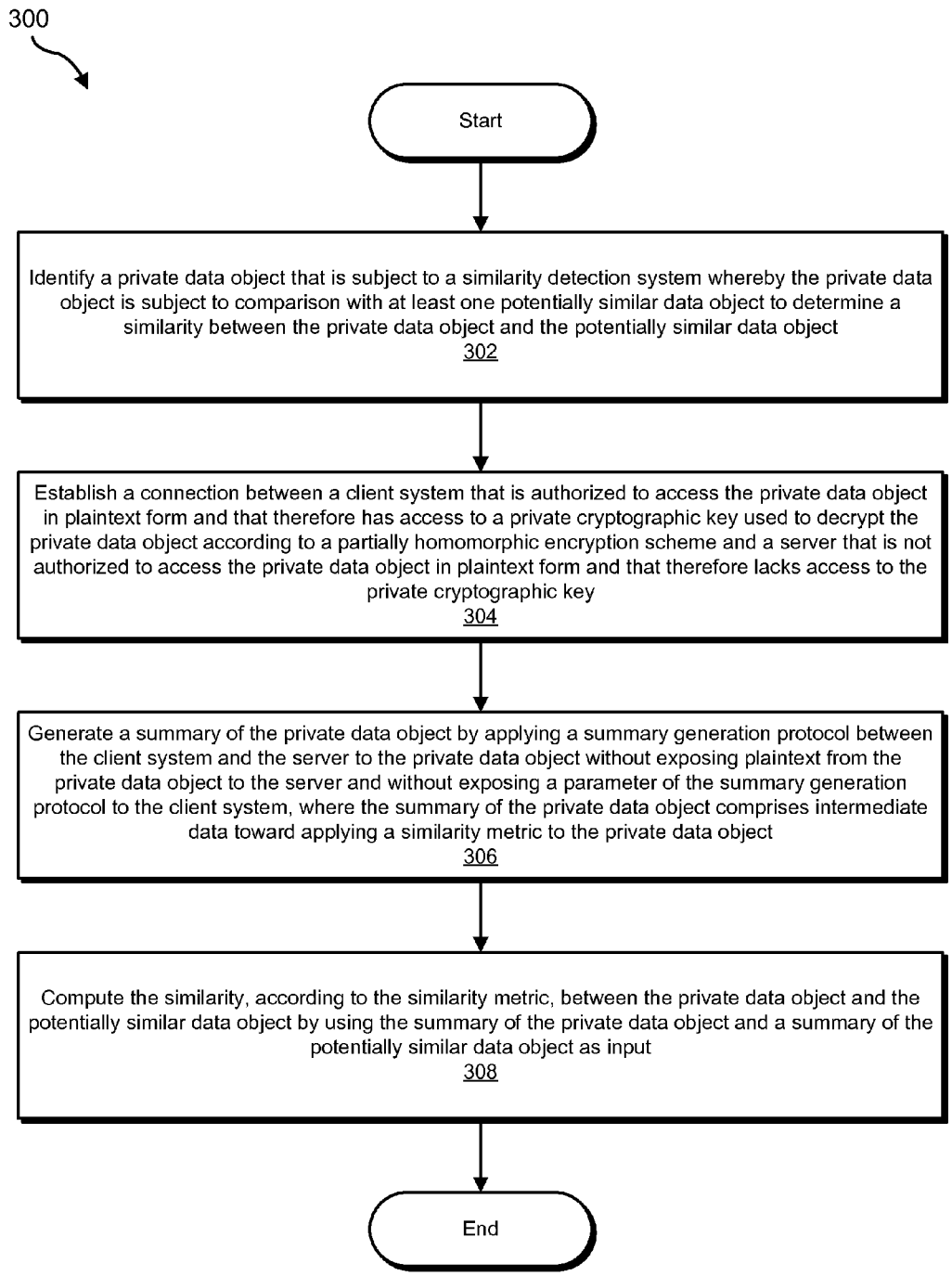
FIG. 3 is a flow diagram of an exemplary method for securely detecting data similarities.

FIG. 3 is a flow diagram of an exemplary computer-implemented method 300 for securely detecting data similarities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a private data object that is subject to a similarity detection system whereby the private data object is subject to comparison with at least one potentially similar data object to determine a similarity between the private data object and the potentially similar data object. For example, identification module 104 may, as part of client system 202 in FIG. 2, identify private data object 122 that is subject to a similarity detection system whereby private data object 122 is subject to comparison with at least one potentially similar data object 240 to determine similarity 250 between private data object 122 and potentially similar data object 240.

As used herein, the term "data object" may refer to any data to which a similarity metric may be applied (e.g., in comparison with another data object). Accordingly, the term "data object" may refer to any of a variety of data collections and/or data structures. In some examples, the private data object may include a data set. Additionally or alternatively, the private data object may include a vector. In some examples, the term "data object" may refer to a document and/or data collection that may be mapped to and/or interpreted as a data set and/or a vector.

As used herein, the term "private data object" may refer to any data object that is private and/or with content that is held secret and/or to which access is restricted. In some examples, an owner and/or a manager of the private data object may control access to the content of the private data object with an encryption scheme that makes use of one or more cryptographic keys. For example, the private data object and/or portions of the private data object may be encrypted before being transmitted and/or exposed to systems and/or parties that are not authorized to access the private data object in plaintext form. As will be explained in greater detail below, in some examples, the private data object may be encrypted according to a partially homomorphic encryption scheme.

Identification module 104 may identify the private data object in any of a variety of contexts. In some examples, identification module 104 may identify the private data object in a data loss prevention context. For example, a data loss prevention system may identify the private data object (e.g., in use, in motion, or at rest) and use the similarity detection system to determine whether the plaintext content of the private data object is similar to the plaintext content of any of a corpus of documents relevant to data loss prevention (e.g., a corpus of documents with sensitive data). Additionally or alternatively, identification module 104 may identify the private data object in an anti-malware context (e.g., determining whether the private data object contains malware), a data discovery context (e.g., identifying all documents in a corpus that match a query), and/or any context in which the use of a similarity detection system may apply.

As used herein, the term "similarity detection" may refer to any suitable procedure for evaluating and/or approximating the similarity of two or more data objects. Accordingly, the similarity detection may determine and/or the similarity of data objects according to any suitable similarity metric. Examples of similarity metrics include, without limitation, Jaccard similarity (e.g., the size of the intersection of two data sets divided by the size of the union of the two data sets) and cosine similarity (e.g., the cosine of the angle between two vectors of an inner product space). In some examples, as will be explained in greater detail below, a similarity detection system may approximate the similarity of two or more data objects may evaluating a similarity between two summaries (e.g., reduced representations) of the data objects.

Identification module 104 may operate in any suitable context. For example, identification module 104 may operate as a part of the client system and identify the private data object at the client system (e.g., when the client system is to access the private data object for similarity detection). Additionally or alternatively, identification module 104 may operate as a part of the server and identify the private data object by receiving an instruction to perform a similarity detection operation for the private data object and/or by receiving data derived from the private data object (e.g., encrypted data derived from the private data object from the client system).

Returning to FIG. 3, at step 304, one or more of the systems described herein may establish a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key. For example, connection module 106 may, as part of client system 202 in FIG. 2, establish connection 220 between client system 202 that is authorized to access private data object 122 in plaintext form and that therefore has access to private cryptographic key 210 used to decrypt private data object 122 according to partially homomorphic encryption scheme 212 and server 206 that is not authorized to access private data object 122 in plaintext form and that therefore lacks access to private cryptographic key 210.

The terms "private cryptographic key" (or "private key") and "secret cryptographic key" (or "secret key") as used herein, may refer to any cryptographic key for accessing plaintext content from a ciphertext. In some examples, the private cryptographic key may represent a private decryption key of an asymmetric key pair that also includes a public encryption key. In some examples, the private cryptographic key may be configured to encrypt data according to a partially homomorphic encryption scheme. The term "partially homomorphic encryption," as used herein, may refer to a form of encryption whereby an operation performed on data in ciphertext form may yield a predictable operation on the data in plaintext form. For example, if m and n are plaintext values, and [m] and [n] are corresponding ciphertext values encrypted with a cryptographic key under a partially homomorphic encryption scheme, an operation involving [m] and [n] (such as [m] *[n]) may compute a ciphertext of an operation involving m and n (e.g., may compute [m+n]). Thus, examples of partially homomorphic encryption may include, without limitation, additive homomorphic encryption and exclusive-or homomorphic encryption. The term "additive homomorphic encryption" may refer to any encryption scheme that allows for the computation of [m+n] given [m] and [n] without access to the private decryption key. Examples of additive homomorphic encryption schemes include, without limitation, the Paillier cryptosystem and the Damgård, Geisler, and Krøigaard (DGK) cryptosystem. The term "exclusive-or homomorphic encryption" may refer to any encryption scheme that allows for the computation of [m⊕n] given [m] and [n] without access to the private decryption key. Examples of exclusive-or homomorphic encryption schemes include, without limitation, the Goldwasser-Micali (GM) cryptosystem. In some examples, the use of partial homomorphic encryption schemes with overlapping homomorphic properties (e.g., Paillier and DGK with additive homomorphic properties) may be substituted for one another. Additionally or alternatively, a more efficient partial homomorphic encryption scheme may be used in place of a less efficient partial homomorphic encryption scheme when the more efficient partial homomorphic encryption scheme has the requisite properties. As will be explained in greater detail below, in some examples, the client system may possess multiple private keys and employ multiple cryptosystems for encrypting the private data object and/or data derived from the private data object. For example, the client system may possess a Paillier private key, a DGK private key, and a GM private key.

Connection module 106 may establish the connection between the server and the client system in any suitable context. For example, connection module 106 may operate as a part of the server and establish the connection upon receiving a request to perform a similarity determination and/or upon receiving a communication from the client system. Additionally or alternatively, connection module 106 may operate as a part of the client system and establish the connection upon receiving a request to perform a similarity determination, as a part of making a request to perform a similarity determination, and/or upon receiving a communication from the server. In some examples, connection module 106 may establish the connection by initiating a protocol between the client system and the server. Additionally or alternatively, connection module 106 may initiate a protocol between the client system and the server once the connection is established.

Returning to FIG. 3, at step 306, one or more of the systems described herein may generate a summary of the private data object by applying a summary generation protocol between the client system and the server to the private data object without exposing plaintext (or, e.g., information about the plaintext) from the private data object to the server and without exposing a parameter of the summary generation protocol to the client system, where the summary of the private data object may include intermediate data toward applying a similarity metric to the private data object. For example, generation module 108 may, as part of client system 202 in FIG. 2, generate summary 230 of private data object 122 by applying summary generation protocol 222 between client system 202 and server 206 to private data object 122 without exposing plaintext (or, e.g., information about the plaintext) from private data object 122 to server 206 and without exposing parameter 224 of summary generation protocol 222 to client system 202, where the summary of private data object 122 may include intermediate data toward applying a similarity metric to private data object 122.

As used herein, the term "summary" may refer to any signature, summary, and/or reduced representation of a data object. In some examples, a summary may share and/or approximate properties of a data object. For example, a comparison performed on two data object summaries may approximate the similarity of the respective data objects according to a similarity metric. In some examples, performing some operations on a summary may be less resource intensive than performing the same operations on the corresponding data object. For example, comparing two summaries according to a similarity metric may be less resource intensive than comparing their corresponding data objects according to the similarity metric. In some examples, one or more summaries may be generated, stored, and/or compared in ciphertext (e.g., so that computing systems such as the server that do not have access to the corresponding private key may contribute to generating and/or using the summaries without having access to the summaries in plaintext form). As will be explained in greater detail below, in some examples a summary may include one or more hash values (e.g., in ciphertext form) of a data object.

The term "summary generation protocol," as used herein, may refer to any protocol and/or procedure for generating a summary under specified conditions. In some examples, the summary generation protocol may involve performing some computations on the client system and some computations on the server to generate the summary. In some examples, the summary generation protocol may ensure that sensitive information held by the server is not exposed to the client system and that sensitive information held by the client system is not exposed to the server. For example, the summary generation protocol may involve one or more parameters that determine the specific summary generated from a given data object. For example, because generating a summary from a data object may involve some amount of data reduction, the parameters may determine what information is preserved and/or what information is discarded in an approximation of the data object. In some examples, the summary generation protocol may involve the server performing computations using the parameters of the summary generation protocol without exposing the parameters to the client system. In addition, the summary generation protocol may involve the client system performing computations on the data object in plaintext form without exposing the data object in plaintext form and/or derivatives of the data object in plaintext form to the server.

As used herein, the term "intermediate data" may refer to data derived from a data object and that represents an intermediate step toward a result of a computation involving the data object. For example, a summary of a data object may represent and/or include intermediate data toward assessing the similarity of the data object to another data object.

Generation module 108 may generate the summary of the private data object in any suitable context. For example, generation module 108 may operate as a part of the client system and generate the summary by performing computations on the client system and engaging in a protocol with the server that results in the production of the summary. Additionally or alternatively, generation module 108 may operate as a part of the server and generate the summary by performing computations on the server and engaging in a protocol with the client system that results in the production of the summary. In some examples, generation module 108 may operate as a part of both the client system and the server and generate the summary by performing certain computations on the client system and performing certain computations on the server. Accordingly, generation module 108 may generate the summary based on computations performed by the server and based on computations performed by the computing system.

In some examples, the summary generation protocol may include one or more sub-protocols. For example, the summary generation protocol may include a protocol for the server securely producing a hash, in encrypted form (e.g., preventing the server from accessing the hash in plaintext), of an input provided by the client system without the plaintext of the input being exposed to the server and without the hash function (e.g., the parameters of the hash function) or the result of the hashing being exposed to the client system. Additionally or alternatively, the summary generation protocol may include a protocol for the server securely producing, in ciphertext form (e.g., preventing access of the plaintext by the server), the minimum of a set provided by the client system (e.g., to the server, in ciphertext form). In turn, a protocol for securely finding a minimum of a set may include one or more sub-protocols. For example, a protocol for securely finding a minimum of a set may include a protocol for the server and the client system producing, for the client system, a result of a comparison between two values (e.g. to determine which is greater) without exposing the values in plaintext form to the server and without exposing which plaintext values are involved to either the client system or the server.

Exemplary protocols will be provided in greater detail below. As used herein, the notation $(s_{out}, c_{out}) \leftarrow \text{protocol}(s_{in}, c_{in})$ may denote a two-party protocol between a client system and a server. Thus, $c_{in}$ may denote the input of a client, $c_{out}$ may denote the output of a client, $s_{in}$ may denote the input of a server, and $s_{out}$ may denote the output of a server.

In one example, a protocol for secure comparison over encrypted data may be denoted by $(-, t) \leftarrow \text{Compare}(([a], [b], PK_{DGK}, PK_{QR}), (SK_{DGK}, SK_{QR}))$. In this example, a and b may represent plaintext values, [a] and [b] may represent the respective values a and b in partially homomorphic ciphertext form, $PK_{DGK}$ and $SK_{DGK}$ may represent a DGK public key and a DGK private key, respectively, and $PK_{QR}$ and $SK_{QR}$ may represent a QR public key and a QR private key, respectively. An exemplary implementation of the Compare protocol is shown in Table 1.

TABLE 1

| Server | Client |
|---|---|
| Input: [a], [b], $PK_{DGK}$, $PK_{QR}$<br>Output: — | Input: $SK_{DGK}$, $SK_{QR}$<br>Output: t = 1 iff a < b |
| $[x] = [2^l] \cdot [b] \cdot [a]^{-1} \mod n$<br>Pick random r for blinding<br>$[z] = [x] \cdot [r] \mod n$<br>    Send [z] → | |
| | $z = D(SK_{DGK}, [z])$<br>$d = z \mod 2^l$ |
| $c = r \mod 2^l$ | Privately Compute<br>\|t'\|, s.t. t' = 1 if c < d<br>← →<br>\|$z_l$\| ← $E(PK_{QR}, z_l)$ |
| | Send \|$z_l$\| ← |
| \|$r_l$\| ← $E(PK_{QR}, r_l)$<br>\|t\| = \|$z_l$\| · \|$r_l$\| · \|t'\| · \|1\|<br>    Send \|t\| → | |
| | \|t\| = $D(SK_{QR}, $\|t\|$)$ |

As shown in Table 1, generation module 108 may perform (e.g., on the part of the client system, on the part of the server, or both) a protocol for the server and the client system producing, for the client system, a result of a comparison between two values (e.g. to determine which is greater) without exposing the values in plaintext form to the server and without exposing which plaintext values are involved to either the client system or the server. In the above example, l may represent a length (e.g., bit length) of each of the input values a and b. The notation $x_l$ may represent the value of bit l of x. The value n may represent the modulus of the cryptosystem (e.g., DGK). The notation $D(K, x)$ may represent a decryption of x with key K while the notation $E(K, x)$ may represent a decryption of x with key K. The notation [x] may represent the ciphertext of x in the DGK cryptosystem, while the notation \|x\| may represent the ciphertext of x in the QR cryptosystem. As may be appreciated, in some examples, variants of the above example protocol may also be used. For example, the Paillier cryptosystem may be used in place of the DGK cryptosystem. In addition, the private computation of \|t'\| may involve any of a variety of suitable sub-protocols for comparing c and d that allows a server to access the plaintext of c but not the plaintext d, and allows a client access to the plaintext of d but not the plaintext of c (and, e.g., that produces an encrypted result). For example, the private computation step in the above exemplary protocol may use any private comparison protocol.

In one example, a protocol for finding a minimum value of a set over encrypted data may be denoted by $([min], -) \leftarrow \text{Findmin}(([a_1], \ldots, [a_n], PK_{DGK}, PK_{QR}, l), (SK_{DGK}, SK_{QR}, l))$, where $\{a_1, \ldots, a_n\}$ represents a set of elements and [min] represents the ciphertext form of the minimum value of the set. An exemplary implementation of the Findmin protocol is shown in Table 2.

TABLE 2

| Server | Client |
|---|---|
| Input: $[a_1], \ldots, [a_n]$, $PK_{DGK}$, $PK_{QR}$, I | Input: $SK_{DGK}$, $SK_{QR}$, I |
| Output: [min] | Output: — |

Pick a random
permutation $\pi$ over
$\{1, \ldots, n\}$
[min] = $[a_{\pi(1)}]$
for i = 2 to n do Compare(([a], [b],
       $PK_{DGK}$, $PK_{QR}$),
       ($SK_{DGK}$, $SK_{QR}$))
       ← →

Client gets bit $t_i$ =
       1 iff min < $a_{\pi(1)}$

Pick random $r_i, s_i$
for blinding
$[b_i] = [\text{min}] \cdot [r_i]$
$[c_i] = [a_{\pi(1)}] \cdot [s_i]$ Send $[b_i], [c_i]$
       → if $t_i$ is 1
        $[v_i]$ ← Refresh($[b_i]$)
       else
        $[v_i]$ ← Refresh($[c_i]$)
       end Send $[v_i], [t_i]$
       ←

[min] = $[v_i] \cdot ([t_i] \cdot [-1])^{s_i} \cdot [t_i]^{-r_i}$
endfor

As shown in Table 2, generation module 108 may perform (e.g., on the part of the client system, on the part of the server, or both) a protocol for the server and the client system securely producing, in ciphertext form (e.g., preventing access of the plaintext by the server), the minimum of a set provided by the client system (e.g., to the server, in ciphertext form). In the above example, the Refresh function may re-encrypt a value (e.g., with a renegotiated cryptographic key).

As may be appreciated from the above exemplary implementation of a Findmin protocol, the protocol may perform a linear number of comparisons. The encrypted values may be considered in order and each comparison may consist of the resulting minimum of the latest comparison and the next value. In some examples, the protocol may prevent the client system from learning the index of the minimum value (and, thereby, prevent an attacker with access to the client system from evading similarity detections). For example, the protocol may select a random permutation $\pi$ that is applied before use of the comparison protocol. Thus, the client system may only learn the index of the minimum value with respect to the secret random permutation used by the server. In addition, in some examples, the find minimum protocol may use a secure comparison protocol, such as the Compare protocol discussed earlier. The client system may thereby learn the relative order between the encrypted values without knowing to which values the relative order applies. In addition, the client system may prevent the server from learning the relative order of the values by re-encrypting the cipher text of the smaller value. The server may then remove the blinding of the smaller value. For example, $r_i$ may represent the blinding of min and $s_i$ may represent the blinding of $a_{\pi(i)}$. Thus, if the result of the comparison of the values is $t_i=1$, implying that min$<a_{\pi(i)}$, the server may subtract the blinding $r_i$, otherwise the server may subtract the blinding $s_i$. The server may accomplish this without access to the plaintext value of $t_i$ via the homomorphic operation:

$$[v_i] \cdot ([t_i] \cdot [-1])^{s_i} \sim [t_i]^{-r_i} = [v_i + s_i \cdot (t_i - 1) - r_i \cdot t_i]$$

In one example, a protocol for secure k-independent hashing may be denoted as $([(a_0 + a_1 x + \ldots + a_{k-1} x^{k-1}) \bmod p], -) \leftarrow \text{kIndepHashing}((a_0, a_1, \ldots, a_{k-1}, p, PK_{DGK}), (SK_{DGK}, x, k))$. In this example, values $\{a_0, a_1, \ldots, a_{k-1}\}$ may represent secret parameters for a hashing function selected and/or privately maintained by the server. An exemplary implementation of the kIndepHashing protocol is shown in Table 3.

TABLE 3

| Server | Client |
|---|---|
| Input: $a_0, a_1, \ldots,$ $a_{k-1}, p, PK_{DGK}$ | |
| Output: $([a_0 + a_1 x + \ldots a_{k-1} x^{k-1}] \bmod p)$ | Input: $SK_{DGK}, x, k$ Output: — | for f = 1 to k − 1 do
           $[x^f] \leftarrow E(PK_{DGK}, x^f)$
          endfor Send $[x], [x^2], \ldots,$
       $[x^{k-1}]$
       ←

Pick random
r for blinding
$[h_1] \leftarrow [a_0] \cdot [r] \cdot \pi_{i=1}^{k-1} [x^i]^{a_i}$ Send $[h_1]$, p
       →

$h_1 = D(SK_{DGK}, [h_1])$
          $d = h_1 \bmod p$ c = r mod p

Privately Compute [t],
       s.t. t = 1 if d < c
       ← →

[d] ← $E(PK_{DGK}, d)$
       Send [d]
       ←

$[h_2] = [d] \cdot ([c])^{-1} \cdot [t]^p$

As shown in Table 3, generation module 108 may perform (e.g., on the part of the client system, on the part of the server, or both) a protocol for the server and the client system securely producing a hash, in ciphertext form (e.g., preventing access of the hash in plaintext by the server), of an input provided by the client system without the plaintext of the input being exposed to the server and without the hash function (e.g., the parameters of the hash function) or the resulting hashed value being exposed to the client system. Thus, in one example, the server may have a k-independent hash function h(•) and the client may have an input x to be hashed. The server may produce as output the encrypted value [h(x)] without revealing the hash function (e.g., the selected parameters $(a_0, a_1, \ldots, a_{k-1})$ of the k-independent hash function).

As used herein, the term "hash function" may refer to any function that deterministically maps a domain of keys to a smaller range of hashes. Accordingly, a hash function may map multiple keys to a single hash. In some examples, the encoded output of a hash function may typically (e.g., always and/or on average) be smaller than the encoded input to the hash function. In some examples, a hash function may be parameterized (e.g., a hash function may produce different particular key-to-hash mappings based on one or more parameters of the hash function). As used herein, the term "k-independent hash function" may refer to any hash function that is a member of a k-independent hash family and/or that statistically approximates the behavior of a member of a k-independent hash family. As used herein, the term "k-independent hash family" may refer to any family of hash functions that, when selected from at random, produces a hash function for which the hashes of k keys are independently random (or, in an approximation of k-independence, statistically near independently random—e.g., to a predefined error threshold). Accordingly, the following function h(•) may be an example of a k-independent hashing function when p is prime and larger than the size of the range of hash values and $(a_0, a_1, \ldots, a_{k-1})$ are selected at random (e.g., due to the function exhibiting properties statistically close to k-independence):

$$h(x) = (a_{k-1}x^{k-1} + \ldots + a_1 x + a_0) \bmod p$$

While the hashing protocol discussed above may use a particular k-independent hash family, in some examples the hash protocol may use a different family of hash functions, the requisite computations for which may be performed via homomorphic operations within a partially homomorphic encryption scheme.

In one example, the summary generation protocol may include generating a minhash signature of a data set (e.g., as the summary of the private data object). For example, the minhash signature may identify a plurality of minimum hash values for the data set that correspond to a plurality of parameterized hash functions (e.g., a k-independent hash family). In one example, the summary generation protocol may generate the minhash signature without, for each minimum hash value in the plurality of minimum hash values, exposing a relative order of hash values for the data set to the client system and without exposing to the server which element of the data set in ciphertext form corresponds to the minimum hash value. An example of a protocol for secure generation of a minhash signature is shown in Table 4.

TABLE 4

| Server | Client |
|---|---|
| Input: $(\alpha_1, [\beta_1], p_1, m_1), \ldots,$<br>$(\alpha_k, [\beta_k], p_k, m_k),$<br>$PK_p, PK_{DGK}, PK_{QR}$<br>Output: $[\sigma]$ | Input: $SK_p, SK_{DGK},$<br>$SK_{QR}, x_1, \ldots, x_n$<br>Output: — |
| for j = 1 to k do<br>  for i = 1 to n do | |
| | Run kIndepHashing<br>protocol<br>← →<br>Client gets $[h_j(x_i)]$ |
| endfor | |
| | Run Findmin<br>protocol<br>← →<br>Client gets $[h_j^{min}]$,<br>from $\{[h_j(x_1)], \ldots,$<br>$[h_j(x_n)]\}$ |
| $[\sigma_j] = [h_j^{min}]$<br>endfor<br>$[\sigma] = [\sigma_1, \ldots, \sigma_k]$ | |

As shown in Table 4, generation module 108 may generate a minhash signature σ in ciphertext form [σ]. Thus, defining the function $h_{min}(S) = \min_{x \in S}(h(x))$ for a given hash function h, generation module 108 may build a vector $[h_{min}^1(S), \ldots, h_{min}^k(S)]$.

In some examples, generation module 108 may apply the summary generation protocol to the private data object by performing, at the server, a homomorphic operation within the partially homomorphic encryption scheme on input data that is derived from the private data object and that is in ciphertext form. For example, as illustrated in Table 1, an exemplary sub-protocol of the summary generation protocol may perform homomorphic operations (e.g., according to an additive homomorphic encryption scheme) at the server to produce [x] from input data [a] and [b], where a and b may be derived from the private data object. In addition, as illustrated in Table 1, an exemplary sub-protocol of the summary generation protocol may perform homomorphic operations (e.g., according to an additive homomorphic encryption scheme) at the server to produce [z] from [x] (which is derived from the input data). Furthermore, as illustrated in Table 1, an exemplary sub-protocol of the summary generation protocol may perform homomorphic operations (e.g., according to an exclusive-or homomorphic encryption scheme) at the server to produce [t] from $|z_l|$ and $|t'|$ (which are derived from the input data). Furthermore, in these examples, the server may lack access to plaintext versions of the data used in the operations and of the data produced by the operations. Similar examples of the server performing such homomorphic operations may be found in the exemplary protocols shown in Table 2 and Table 3. Furthermore, the server may rely on such exemplary protocols, or protocols that similarly rely on such homomorphic operations, in the exemplary protocol shown in Table 4.

In some examples, generation module 108 may operate from the client system. Accordingly, generation module 108 may apply the summary generation protocol to the private data object by providing, from the client to the server, input data that is derived from the private data object and that is in ciphertext form. Generation module 108 may then receive, at the client from the server, a result of the server performing a computation comprising a homomorphic operation within the partially homomorphic encryption scheme on the input data. Examples of such homomorphic operations may be found in the exemplary sub-protocols shown in Tables 1, 2, and 3, and an example of an ultimate reliance on such homomorphic operations to produce the summary may be found in the exemplary protocol shown in Table 4.

In one embodiment, (1) the private data object may include a data set, (2) generating the summary of the private data object may include identifying a plurality of minimum hash values for the data set that correspond to a plurality of parameterized hash functions without, for each minimum hash value in the plurality of minimum hash values, exposing a relative order of hash values for the data set to the client system and without exposing to the server which element of the data set in ciphertext form corresponds to the minimum hash value, and (3) the parameter of the summary generation protocol may include a parameter of at least one of the plurality of parameterized hash functions. For example, the private object may correspond to the data set $x_1, \ldots, x_n$ shown in Table 4. By using a sub-protocol such as the kIndepHashing protocol shown in Table 3, the protocol shown in Table 4 may identify a plurality of minimum hash values for the data set. In addition, due to the use of homomorphic operations (e.g., performed at the server), the protocol shown in Table 4 may identify the minimum hash values without, for each minimum hash value in the plurality of minimum hash values, exposing a relative order of hash values for the data set to the client system and without exposing to the server which element of the data set in ciphertext form corresponds to the minimum hash value. Likewise, through the use of homomorphic operations, the protocol shown in Table 4 may avoid exposing the parameters of the hash functions used, thereby preventing the evasion of similarity detection through modifying the private data object in such a way as to manipulate the minimum hash results.

Furthermore, as shown by way of example in Table 1, Table 2, and Table 4, generation module 108 may identify the plurality of minimum hash values for the data set by performing a plurality of comparisons between a plurality of candidate minimum hash values and performing the plurality of comparisons may include providing, for each comparison in the plurality of comparisons, a result of the comparison to the client system without exposing to the client system to which elements within the data set the result of the comparison pertains.

In some examples, the private data object may include a vector and generation module 108 may generate the summary of the private data object without exposing a random projection applied to the vector to the client system. For example, generation module 108 may generate the signature of the private data object by generating a simhash signature of the vector.

In some examples, the server (and/or other systems sharing the functionality of the server) may create summaries for various private data objects from various client systems (e.g., owned and/or managed by different parties than the owner and/or manager of the private data object and/or client system and, thus, lacking access to the plaintext version of the private data object). Accordingly, in some examples, the summary of the potentially similar data object may have been generated in a fashion similar to the generation of the summary of the private data object. For example, the summary of the potentially similar data object may have been generated (e.g., by one or more of the systems or methods described herein) without exposing plaintext (or, e.g., information about the plaintext) from the potentially similar data object to the server and without exposing a parameter of the summary generation protocol used by the server to an additional client system authorized to access the potentially similar data object in plaintext form.

Figure 4:
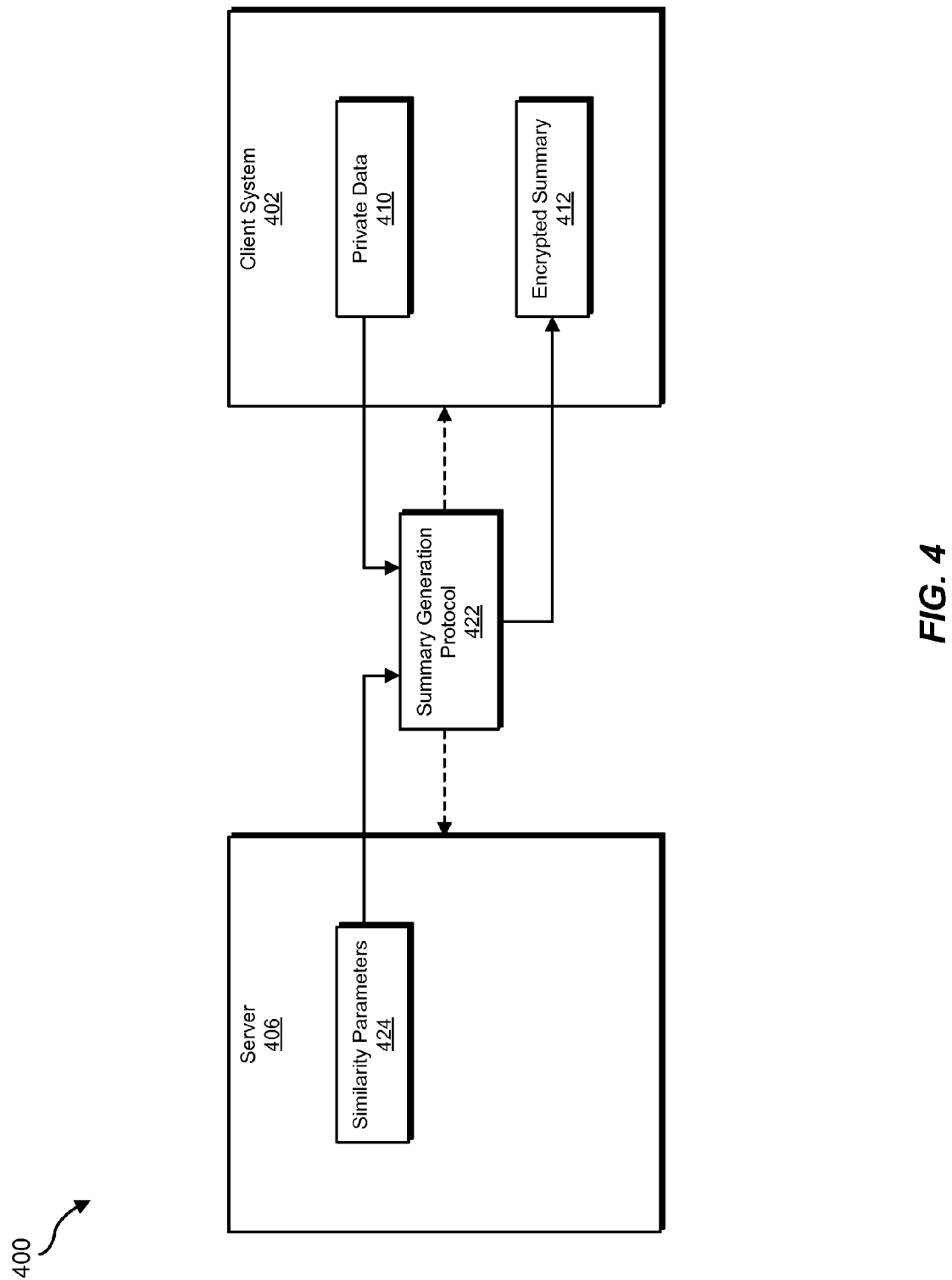
FIG. 4 is a block diagram of an exemplary computing system for securely detecting data similarities.

FIG. 4 is a block diagram of an exemplary computing system 400 for securely detecting data similarities. As shown in FIG. 4, system 400 may include a client system 402 with private data 410 and a server 406 with similarity parameters 424. In some examples, client system 402 may keep private data 410 private from server 406 and server 406 may keep similarity parameters 424 private from client system 402. However, client system 402 and server 406 may engage in a summary generation protocol 422 that generates an encrypted summary 412 of private data 410 without exposing private data 410 (e.g., in plaintext form) to server 406 and without exposing similarity parameters 424 to client system 402. In this manner, client system 402 may maintain the privacy of private data 410 without being able to manipulate the result of encrypted summary 412 based on a knowledge of similarity parameters 424 to make private data 410 appear dissimilar to data that is actually similar.

Returning to FIG. 3, at step 308, one or more of the systems described herein may compute the similarity, according to the similarity metric, between the private data object and the potentially similar data object by using the summary of the private data object and a summary of the potentially similar data object as input. For example, computation module 110 may, as part of client system 202 in FIG. 2, compute similarity 250, according to the similarity metric, between private data object 122 and potentially similar data object 240 by using summary 230 of private data object 122 and summary 242 of potentially similar data object 240 as input.

Computation module 110 may compute the similarity according to any suitable similarity metric. For example, computation module 110 may compute the similarity to approximate Jaccard similarity. For example, the summary of the private data object and the summary of the potentially similar data object may have been generated according to the same summary generation parameters. In one example, generation module 108 may have generated the summary of the private data object (e.g., a data set $S_1$) and the summary of the potentially similar data object (e.g., a data set $S_2$) as minhash signatures (e.g., a vector $[h_{min}^1(S_1) \ldots, h_{min}^k(S_1)]$ and a vector $[h_{min}^1(S_2), \ldots, h_{min}^k(S_2)]$, respectively). Computation module 110 may then determine the probability that for a randomly selected h in $\{h^1, \ldots, h^k\}$, that $h_{min}(S_1)=h_{min}(S_2)$. For example, computation module 110 may average the results of $h_{min}(S_1)=h_{min}(S_2)$ across all h in $\{h^1, \ldots, h^k\}$.

In some examples example, computation module 110 (and/or generation module 108) may build a sketch of the private data object based on the minhash signature vector, and use the sketch for estimating the similarity of the private data object with another data object. For example, an odd sketch of a set S, denoted herein as odd(S), may consist of an array T of size m>2 bits and a hash function h:U→[m]. Generation nodule 108 may hash each element of S to a location of T using h by flipping the bit at the location of T. For example, in the case that h(x)=i and T[i] is zero, the addition of x may change T[i] to one; in the case that T[i] is one, the addition of x may change T[i] to zero. Thus, table T may store the parity of each location of the table. As may be appreciated, the exclusive-or of two odd sketches may be equal to the sketch of the symmetric set difference; i.e., $odd(S_1) \oplus odd(S_2) = odd(S_1 \Delta S_2)$. The odd sketch may therefore be used to estimate the Jaccard similarity. For example, computation module 110 (and/or generation module 108) may use the minhash signature of the private data as a set S in an operation odd(S). For example, generation module 108 may select k minhash functions and create the minhash signature of set S. Generation module 108 may hash each of the elements $e_i = h_{min}^i(S)$ using the hash function of the odd sketch and may flip the bit in position $h(e_i)$ of T. Following the same procedure for two sets $S_1$ and $S_2$, generation module 108 may build two odd sketches that are based on minhashing $odd(S_1)$ and $odd(S_2)$. By computing the exclusive-or $odd(S_1) \Delta odd(S_2)$, generation module 108 may estimate the Jaccard similarity with the following formula (where $odd(S_1) \Delta odd(S_2)$ denotes the number of 1s in the xor-ed sketch):

$$J^{odd} = 1 - \frac{|S_1 \Delta S_2|}{2k} = 1 + \frac{m}{4k}\left(1 - \frac{2|odd(S_1) \Delta odd(S_2)|}{m}\right)$$

In some examples, computation module 110 may reuse the summary of the private data object to determine the similarity of the private data object with other data objects. For example, computation module 110 may reuse the summary of the private data object to compute a similarity, according to the similarity metric, between the private data object and an additional potentially similar data object by using the summary of the private data object and a summary of the additional potentially similar data object as input. In this manner, a private data object may be securely compared to a large number of data objects at a low computational cost, because the summary generation protocol may only be run one time to generate the summary of the private data object.

Once computation module 110 has determined the similarity, various systems and methods described herein may use the similarity. For example, systems described herein may include applying a data loss prevention policy to the private data object based on the similarity. For example, if the summary of the private data object shows a similarity to the summary of a document in a data loss prevention corpus, systems described herein may apply a data loss prevention policy to the private data object (by, e.g., preventing the private data object from leaving the network). Advantageously, the systems described herein may be able to apply the data loss prevention policy to the private data object without inspecting the plaintext of the private data object and while preventing an attacker from gaining and exploiting knowledge of parameters of the summary generation protocol to evade detection by a data loss prevention system. In another example, systems described herein may subject the private data object to a malware assessment (e.g., by comparing the summary of the private data object to summaries of known safe and/or known malicious data objects) without inspecting the plaintext of the private data object and while preventing an attacker from gaining and exploiting knowledge of parameters of the summary generation protocol to evade detection by an anti-malware system. In a further example, systems described herein may subject the private data object to legal and/or electronic discovery (e.g., by comparing the summary of the private data object to the summary of a query) without inspecting the plaintext of the private data object and while preventing an attacker from gaining and exploiting knowledge of parameters of the summary generation protocol to evade detection by an electronic discovery system.

In some examples, the private data object may correspond to a vector. In these examples, computation module 110 may compute the similarity to evaluate and/or approximate a cosine similarity between the private data object and another vector to which the private data object is being compared.

Figure 5:
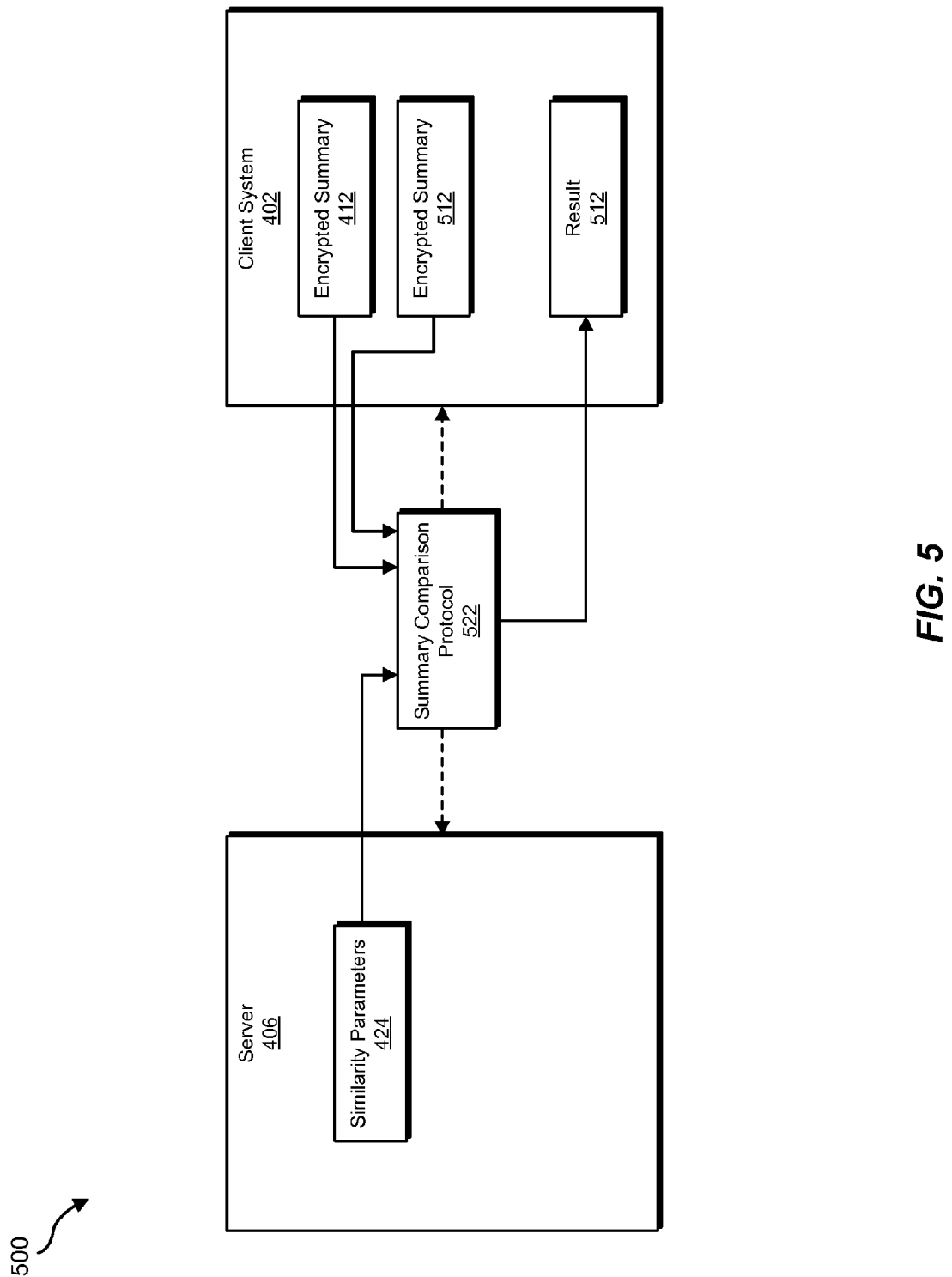
FIG. 5 is a block diagram of an exemplary computing system for securely detecting data similarities.

FIG. 5 is a block diagram of an exemplary computing system 500 for securely detecting data similarities. As shown in FIG. 5, client system 402 may possess encrypted summary 412 (e.g., of private data 410 in FIG. 4) and an encrypted summary 512 (e.g., of private data to be compared with private data 410 for similarity). Accordingly, client system 402 and server 406 may engage in a summary comparison protocol 522 without server 406 exposing similarity parameters 424 to client system 402. Client system 402 may then receive a result 512 of summary comparison protocol 522 (e.g., that indicates whether and/or to what degree private data 410 and the private data from which encrypted summary 512 was derived are similar).

As explained above in connection with method 300 in FIG. 3, secure approximation mechanisms may employ parameters that dictate the approximation method being used to perform efficient cryptographic similarity detection. Revealing these parameters may cause undermine similarity detection when mutually distrustful and/or potentially malicious parties are involved in the similarity detection. For example, knowing the values of such parameters may enable a malicious party to launch an offline attack aiming to conceal information from the similarity detection mechanism. For example, in order to reduce computation in similarity detection, a similarity detection scheme may first shrink the search space by introducing a random function (such as a hash function) that will randomly project data to a smaller space. However, if parties possess the parameters of such a hash function (e.g., the exact formula of the function) to perform the computations locally on their own private data (before any comparison is initiated), malicious parties may be able to conceal data by manipulating the dataset in order to reduce the effect of sensitive data on the resulting hash-derived signatures.

Accordingly, the systems and methods described herein may use partially homomorphic encryption schemes and secure two-party computation protocols in order to guarantee the privacy of the compared data and to guarantee that the similarity detection parameters remain private. For example, in the case of data sets these systems may securely approximate the Jaccard similarity and in the case of vectors these systems may securely approximate the cosine similarity. In some examples, various data structures may be expressed and/or interpreted as data sets and/or vectors.

In some examples, the systems described herein may use an additive homomorphic encryption scheme such as DGK, an additive homomorphic encryption scheme such as Paillier, and an exclusive-or homomorphic scheme such as GM. Homomorphic cryptosystems may facilitate performing operations between ciphertexts where the resulting ciphertext contains an operation over the plaintexts. For example, by multiplying two ciphertexts that are encrypted with the Paillier cryptosystem, the systems described herein may produce an encryption of the addition of the plaintexts. In some examples, the systems described herein may use partially homomorphic encryption schemes such as Paillier, GM, and DGK instead of a fully homomorphic encryption scheme for scalability and for fast computations.

In order to perform the computations for similarity detection, the systems described herein may use a variety of efficient two-party computation protocols. In one example, one party may possess some encrypted information and the other party may possess the secret cryptographic key. An example two-party protocol may efficiently compute a function of the encrypted data. Such a protocol may use a sub-protocol for secure comparison with encrypted inputs. In addition, such a protocol may use a sub-protocol for finding the minimum value within a set of encrypted values. Using a combination of the cryptosystems and the protocols discussed herein, the systems described herein may build small minhashing signatures that are used to approximate the similarity of the original data sets. In addition, protocols described herein may handle bit-masks in order to perform operations on encrypted binary strings. Systems described herein may use such tools for building an encrypted odd-sketch to approximate even faster the similarity of the sets. The systems described herein may build the signatures, summaries, and/or sketches described herein once but reuse these signatures, summaries, and/or sketches for many future comparisons.

Systems described herein may treat hash functions used by the similarity detection mechanism as private information. For example, an example hash function $h(x)$ may be a k-wise independent hash function that is a polynomial of degree $k-1$ modulo a prime p. In this example, $h(x)$ may be expressed as $(a_0+a_1x+ \ldots +a_{k-1}x^{k-1})$ mod p. In this example, x may represent the input of the hash function and the set of randomly picked coefficients $a_0, a_1, \ldots, a_{k-1}$ may represent the parameters of the hash function. However, an attacker in possession of these parameters may find an x' that is smaller than a fixed hash value and therefore use $h(x')$ as a part of the minhash signature instead. This substitution of the valid hash value of the original set with $h(x')$ may completely alter the minhash signature of the set. By using the homomorphic properties of the various cryptosystems described herein to perform the hashing over encrypted input, the systems described herein may avoid providing parameters of the hash function to participating parties.

Figure 6:
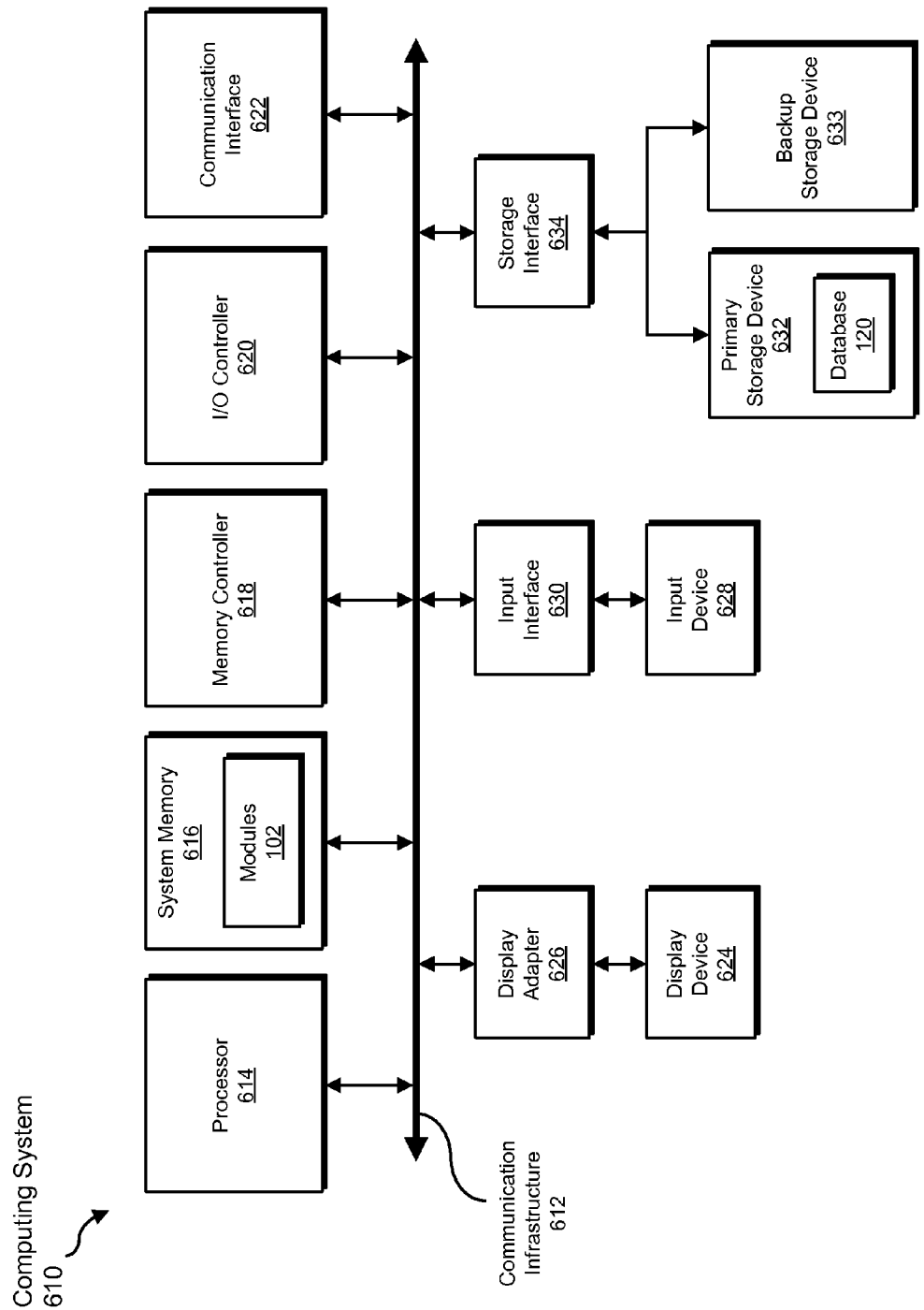
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
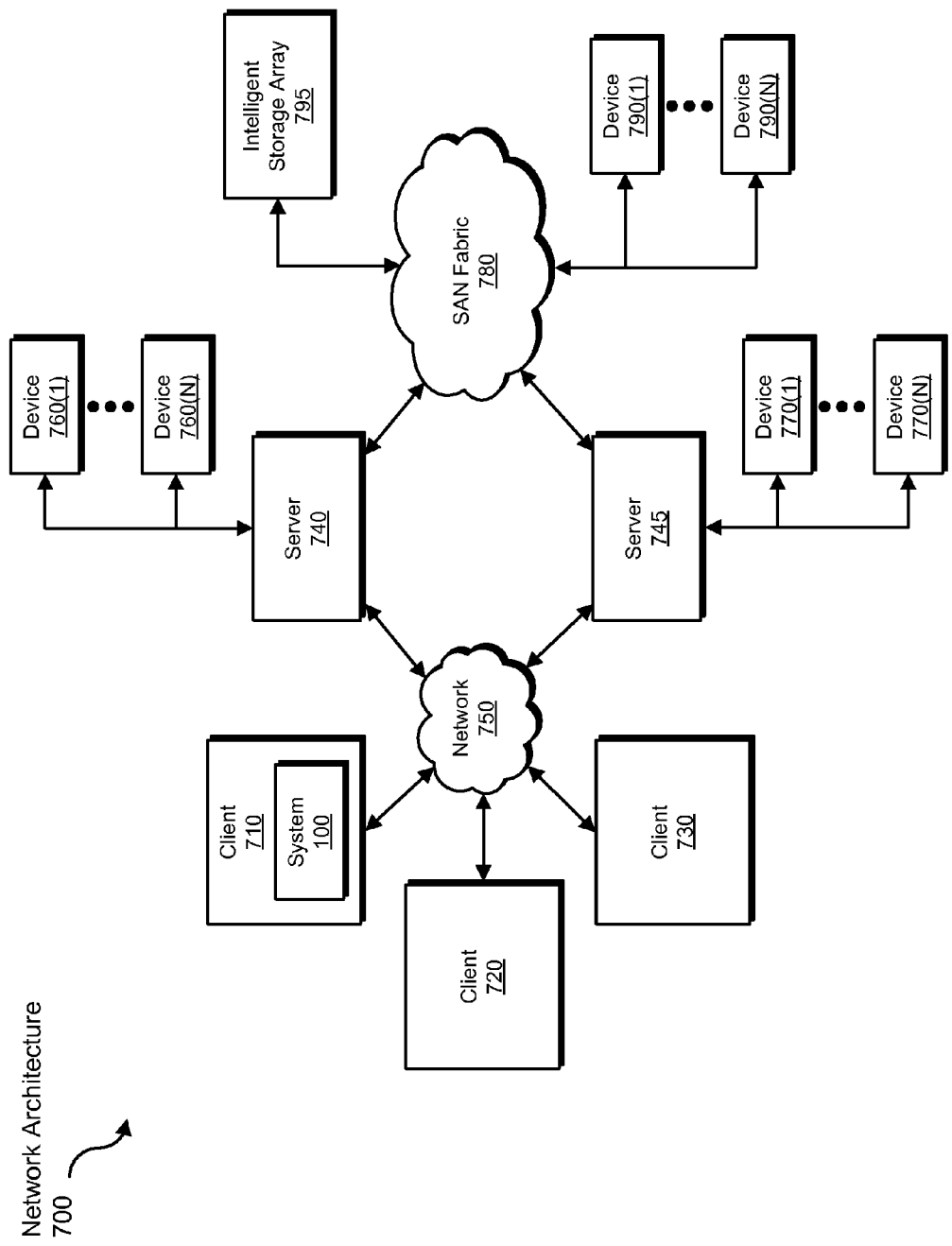
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for securely detecting data similarities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a private data object to be transformed, transform the private data object into an encrypted summary of the plaintext of the private data object, output a result of the transformation to a client system, use the result of the transformation to detect the similarity between the plaintext of the private data object and another data object, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securely detecting data similarities, at least a portion of the method being performed by a computing device comprising at least one processor, the method comprising:
   identifying a private data object that is subject to a similarity detection system whereby the private data object is subject to comparison with at least one potentially similar data object to determine a similarity between the private data object and the potentially similar data object;
   establishing a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key;
   generating a summary of the private data object by applying a summary generation protocol between the client system and the server to the private data object without exposing plaintext from the private data object to the server and without exposing a parameter of the summary generation protocol to the client system, wherein the summary of the private data object comprises intermediate data toward applying a similarity metric to the private data object, wherein the parameter partially determines the summary of the private data object and is selected and privately maintained by the server; and
   computing the similarity, according to the similarity metric, between the private data object and the potentially similar data object by using the summary of the private data object and a summary of the potentially similar data object as input.

2. The computer-implemented method of claim 1, further comprising reusing the summary of the private data object to compute a similarity, according to the similarity metric, between the private data object and an additional potentially similar data object by using the summary of the private data object and a summary of the additional potentially similar data object as input.

3. The computer-implemented method of claim 1, wherein the summary of the potentially similar data object was generated without exposing plaintext from the potentially similar data object to the server and without exposing a parameter of the summary generation protocol used by the server to an additional client system authorized to access the potentially similar data object in plaintext form.

4. The computer-implemented method of claim 1, wherein applying the summary generation protocol to the private data object comprises performing, at the server, a homomorphic operation within the partially homomorphic encryption scheme on input data that is derived from the private data object and that is in ciphertext form.

5. The computer-implemented method of claim 1, wherein applying the summary generation protocol to the private data object comprises:
   providing, from the client to the server, input data that is derived from the private data object and that is in ciphertext form;
   receiving, at the client from the server, a result of the server performing a computation comprising a homomorphic operation within the partially homomorphic encryption scheme on the input data.

6. The computer-implemented method of claim 1, wherein:
   the private data object comprises a data set;
   generating the summary of the private data object comprises identifying a plurality of minimum hash values for the data set that correspond to a plurality of parameterized hash functions without, for each minimum hash value in the plurality of minimum hash values, exposing a relative order of hash values for the data set to the client system and without exposing to the server which element of the data set in ciphertext form corresponds to the minimum hash value;

the parameter of the summary generation protocol comprises a parameter of at least one of the plurality of parameterized hash functions.

7. The computer-implemented method of claim 6, wherein:

identifying the plurality of minimum hash values for the data set comprises performing a plurality of comparisons between a plurality of candidate minimum hash values;

performing the plurality of comparisons comprises providing, for each comparison in the plurality of comparisons, a result of the comparison to the client system without exposing to the client system to which elements within the data set the result of the comparison pertains.

8. The computer-implemented method of claim 1, wherein:

the private data object comprises a vector;

generating the summary of the private data object comprises generating the summary without exposing a random projection applied to the vector to the client system.

9. The computer-implemented method of claim 1, wherein generating the summary comprises generating the summary based on computations performed by the server and based on computations performed by the computing system.

10. The computer-implemented method of claim 1, further comprising applying a data loss prevention policy to the private data object based on the similarity.

11. A system for securely detecting data similarities, the system comprising:

an identification module, stored in memory, that identifies a private data object that is subject to a similarity detection system whereby the private data object is subject to comparison with at least one potentially similar data object to determine a similarity between the private data object and the potentially similar data object;

a connection module, stored in memory, that establishes a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key;

a generation module, stored in memory, that generates a summary of the private data object by applying a summary generation protocol between the client system and the server to the private data object without exposing plaintext from the private data object to the server and without exposing a parameter of the summary generation protocol to the client system, wherein the summary of the private data object by intermediate data toward applying a similarity metric to the private data object, wherein the parameter partially determines the summary of the private data object and is selected and privately maintained by the server;

a computation module, stored in memory, that computes the similarity, according to the similarity metric, between the private data object and the potentially similar data object by using the summary of the private data object and a summary of the potentially similar data object as input; and at least one physical processor configured to execute the identification module, the connection module, the generation module, and the computation module.

12. The system of claim 11, wherein the computation module further reuses the summary of the private data object to compute a similarity, according to the similarity metric, between the private data object and an additional potentially similar data object by using the summary of the private data object and a summary of the additional potentially similar data object as input.

13. The system of claim 11, wherein the summary of the potentially similar data object was generated without exposing plaintext from the potentially similar data object to the server and without exposing a parameter of the summary generation protocol used by the server to an additional client system authorized to access the potentially similar data object in plaintext form.

14. The system of claim 11, wherein the generation module applies the summary generation protocol to the private data object by performing, at the server, a homomorphic operation within the partially homomorphic encryption scheme on input data that is derived from the private data object and that is in ciphertext form.

15. The system of claim 11, wherein the generation module applies the summary generation protocol to the private data object by:

providing, from the client to the server, input data that is derived from the private data object and that is in ciphertext form;

receiving, at the client from the server, a result of the server performing a computation comprising a homomorphic operation within the partially homomorphic encryption scheme on the input data.

16. The system of claim 11, wherein:

the private data object comprises a data set;

the generation module generates the summary of the private data object by identifying a plurality of minimum hash values for the data set that correspond to a plurality of parameterized hash functions without, for each minimum hash value in the plurality of minimum hash values, exposing a relative order of hash values for the data set to the client system and without exposing to the server which element of the data set in ciphertext form corresponds to the minimum hash value;

the parameter of the summary generation protocol comprises a parameter of at least one of the plurality of parameterized hash functions.

17. The system of claim 16, wherein:

the generation module identifies the plurality of minimum hash values for the data set by performing a plurality of comparisons between a plurality of candidate minimum hash values;

the generation module performs the plurality of comparisons by providing, for each comparison in the plurality of comparisons, a result of the comparison to the client system without exposing to the client system to which elements within the data set the result of the comparison pertains.

18. The system of claim 11, wherein:

the private data object comprises a vector;

the generation module generates the summary of the private data object without exposing a random projection applied to the vector to the client system.

19. A non-transitory computer-readable medium comprising computer-readable instructions that, when executed by at least one processor of a computing device, cause the computing device to:
   identify a private data object that is subject to a similarity detection system whereby the private data object is subject to comparison with at least one potentially similar data object to determine a similarity between the private data object and the potentially similar data object;
   establish a connection between a client system that is authorized to access the private data object in plaintext form and that therefore has access to a private cryptographic key used to decrypt the private data object according to a partially homomorphic encryption scheme and a server that is not authorized to access the private data object in plaintext form and that therefore lacks access to the private cryptographic key;
   generate a summary of the private data object by applying a summary generation protocol between the client system and the server to the private data object without exposing plaintext from the private data object to the server and without exposing a parameter of the summary generation protocol to the client system, wherein the summary of the private data object comprises intermediate data toward applying a similarity metric to the private data object, wherein the parameter partially determines the summary of the private data object and is selected and privately maintained by the server; and
   compute the similarity, according to the similarity metric, between the private data object and the potentially similar data object by using the summary of the private data object and a summary of the potentially similar data object as input.

20. The computer-implemented method of claim 1, wherein generating the summary of the private data object without exposing the parameter of the summary generation protocol to the client system comprises applying the parameter of the summary generation protocol at the server, according to a partially homomorphic encryption scheme, to data that is in ciphertext form and that is derived from the private data object.

\* \* \* \* \*